United States Patent [19]

Miyazawa et al.

[11] Patent Number: 4,864,442

[45] Date of Patent: Sep. 5, 1989

[54] MAGNETIC READ/WRITE APPARATUS

[75] Inventors: Osamu Miyazawa; Nobuo Ishikawa; Mamoru Miyasaka; Kenichi Hirota, all of Suwa, Japan

[73] Assignee: Seiko Epson Corporation, Tokyo, Japan

[21] Appl. No.: 92,912

[22] PCT Filed: Dec. 17, 1986

[86] PCT No.: PCT/JP86/00638

§ 371 Date: Aug. 20, 1987

§ 102(e) Date: Aug. 20, 1987

[87] PCT Pub. No.: WO87/03996

PCT Pub. Date: Jul. 2, 1987

[30] Foreign Application Priority Data

Dec. 25, 1985 [JP] Japan ............................ 60-201605[U]
Jan. 6, 1986 [JP] Japan .................... 61-261[U]
May 1, 1986 [JP] Japan ............................ 61-101259[U]
May 1, 1986 [JP] Japan ............................ 61-101260[U]
May 16, 1986 [JP] Japan ............................. 61-73569[U]
May 19, 1986 [JP] Japan ............................. 61-74747[U]
Aug. 27, 1986 [JP] Japan ................................ 61-200303
Aug. 27, 1986 [JP] Japan ............................ 61-130954[U]

[51] Int. Cl.⁴ ............................................. G11B 5/12
[52] U.S. Cl. ............................................. 360/99.12
[58] Field of Search .................... 360/97, 98.08, 99.05, 360/99.12

[56] References Cited

U.S. PATENT DOCUMENTS

4,573,093 2/1986 Obama ............................. 360/97

Primary Examiner—A. J. Heinz
Attorney, Agent, or Firm—Blum Kaplan

[57] ABSTRACT

In magnetic read/write apparatus having a media hub (2) made of magnetic material provided with a magnetic disk (1) and a package so as to cover the magnetic disk with a shell, to position the media hub (2) in the axial direction is performed by attaching an end of a spindle hub (17) to a media hub (2), and to position the media hub in the radial direction is performed by attaching the inner side of a center core (4) integrally formed with the media hub (2) to the periphery of the spindle hub (17). Furthermore, a driving pin (21) for contacting the media hub (2) with the spindle hub (17) is provided at the end of the media hub (2) and in the inner side of the center core (4), thereby, making it possible to provide a small-sized spindle hub and an excellent head contact.

10 Claims, 11 Drawing Sheets

MAGNETIC READ/WRITE APPARATUS

TECHNICAL FIELD

The present invention relates to a magnetic read/write apparatus having a media hub made of magnetic material, and more particularly, to a spindle construction of a magnetic read/write apparatus.

TECHNICAL BACKGROUND

Figure 2:
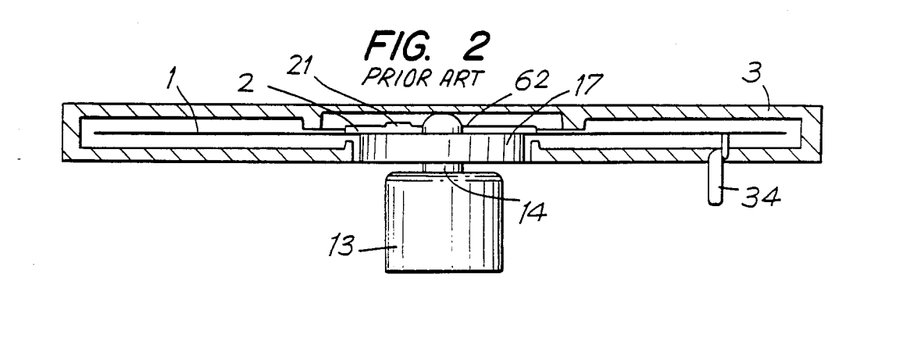
FIG. 2 is a sectional view of the prior magnetic read/write apparatus.

The prior magnetic read/write apparatus described in U.S. Pat. No. 4,445,157, as shown in FIG. 2, has the construction that a spindle hub 17 is directly secured at a spindle 14 of a spindle motor 13, a disk hub 2 including a magnetic disk 1 within a disk cartridge 3 is brought in contact with a spindle hub 17 directly by a magnetic attraction and the engaging portion between a guide hole 62 and a motor spindle 14 is positioned so as to guide the motor spindle radially relative to the magnetic disk. Further, a driving pin 21 for driving the magnetic disk 1 is constructed at the periphery of the guided portion radially.

However, in the prior magnetic read/write apparatus since the magnetic disk is radially guided relative to the spindle, the motor spindle has such a shape as an end of the spherical surface and an inclined portion in order to insert it easily. Furthermore, the larger the diameter of the motor spindle is made to secure the strength and the positioning accuracy, the more clearance is required, making it impossible to provide a small-sized magnetic read/write apparatus. Moreover, since the driving pin is constructed at the periphery of the motor spindle, it is difficult to provide a small-sized media hub and a small-sized spindle hub. Therefore, it is difficult to increase the data storage capacity with securing the magnetic disk at a wide area, and the contacting portion between the magnetic dish and the magnetic head (hereinafter referred to as the head contact) is operated rigidly on appearance thus, is not well fit for the device, making it impossible to obtain an excellent magnetic read/write characteristics.

Therefore, to solve the above problems, the object of the present invention is to provide a small-sized spindle hub and a small-sized media hub and provide a magnetic read/write apparatus possible of an excellent head contact.

DESCRIPTION OF THE INVENTION

The present invention relates to a magnetic read/write apparatus utilizing magnetic disks, which has a media hub made of magnetic material, comprises a spindle hub for positioning the media hub in the thickness direction at the upper surface thereof, a center core, wherein the inside is integrally formed with the media hub, and is in contact with the side of the spindle hub to position it radially relative to the magnetic disk, and a driving pin provided in the spindle hub to contact the spindle hub with the media hub toward the center in the inside of the center core.

BEST MODE FOR CARRYING OUT OF THE INVENTION

Figure 1:
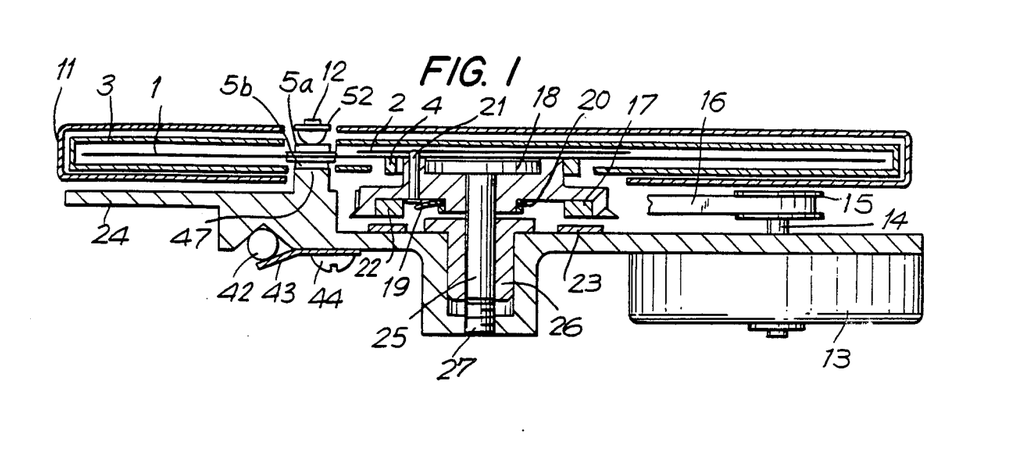
FIG. 1 is a sectional view of one embodiment according to a magnetic read/write apparatus of the present invention.
Figure 9:
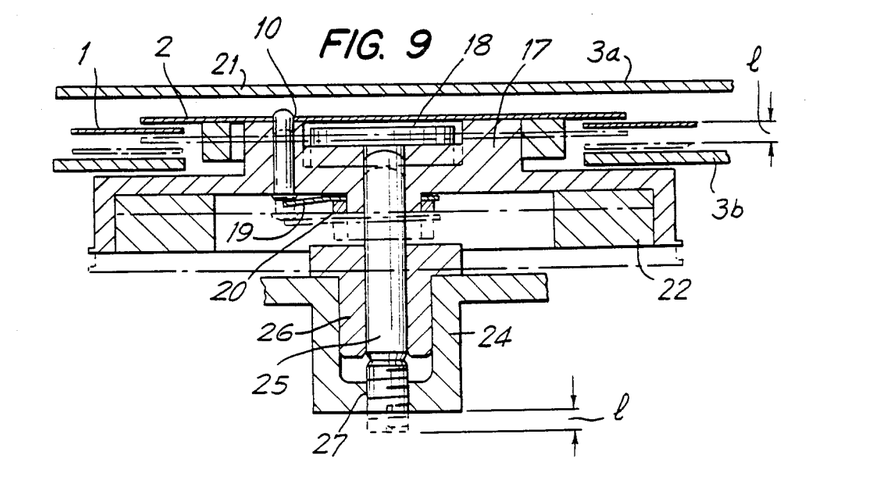
FIG. 9 a explanatory view showing the operation of the embodiment according to the magnetic read/write apparatus of the present invention.

FIG. 1 is a sectional view of the embodiment according to the magnetic read/write apparatus of the present invention, and FIG. 9 is an explanatory view thereof. The reference numeral 1 is a magnetic disk, the reference numeral 2 is a media hub made of magnetic material to attach a magnetic disk 1 on a spindle hub 17 by the magnetic attraction force of magnet 18. The reference numeral 3 is a disk cartridge for storing the magnetic disk 1 and the like. The reference numeral 4 is a center core to position the media hub radially relative to the spindle hub 17. The reference numeral 5a is a upper cleaning plate for pressing against the liner to clean the surface of the magnetic disk 1. The reference numeral 5b is a lower cleaning plate provided in opposition to the upper cleaning plate 5a and the magnetic disk 1, and is in contact with the plate positioning portion 47. The reference numeral 11 is a holder for keeping the disk cartridge. The reference numeral 12 is a pressing cross point mounted on the pressing spring portion 52, and for pressing against the upper cleaning plate. The reference numeral 13 is a spindle hub for driving the spindle hub through a belt 16, a motor pully 15 and motor spindle 14. The reference numeral 19 is a driving pin spring for giving the resilient power in order to press up the driving pin 21 which is provided in the spindle hub and is movable in the axial direction relative to the spindle 25. The reference numeral 20 is a spring pressure for securing the driving pin spring 19. The reference numeral 23 is a thrust yoke made of magnetic material and is formed integrally with or separately from a casing 24, for contacting with the thrust magnet 22 covered with the spindle hub toward the lower side. The reference numeral 26 is a shaft receiver for supporting the free rotation and the movement of the axial direction of the spindle 25 engaged with the spindle hub 17. The reference numeral 27 is an adjusting screw for adjusting the position of the spindle in the axial direction, the screw mount being in mesh with the casing 24. The reference numeral 42 is a slide axis for sliding the magnetic head. The reference numeral 43 is a pressing spring for pressing the slide axis. The reference numeral 44 is a fixing screw for fixing the pressing spring 43.

In such a construction, upon the rotation of the adjusting screw 27, the adjusting screw 27 is moved vertically. While the spindle engaged with the spindle hub 17 is drawn downward by the thrust magnet 22, and is moved vertically by the attachment to the adjusting screw 27. Therefore, since the magnetic disk 1 is mounted on the spindle hub 17, for example, when the adjusting screw 27 is moved down, the magnetic disk 1 is also moved down.

Figure 5:
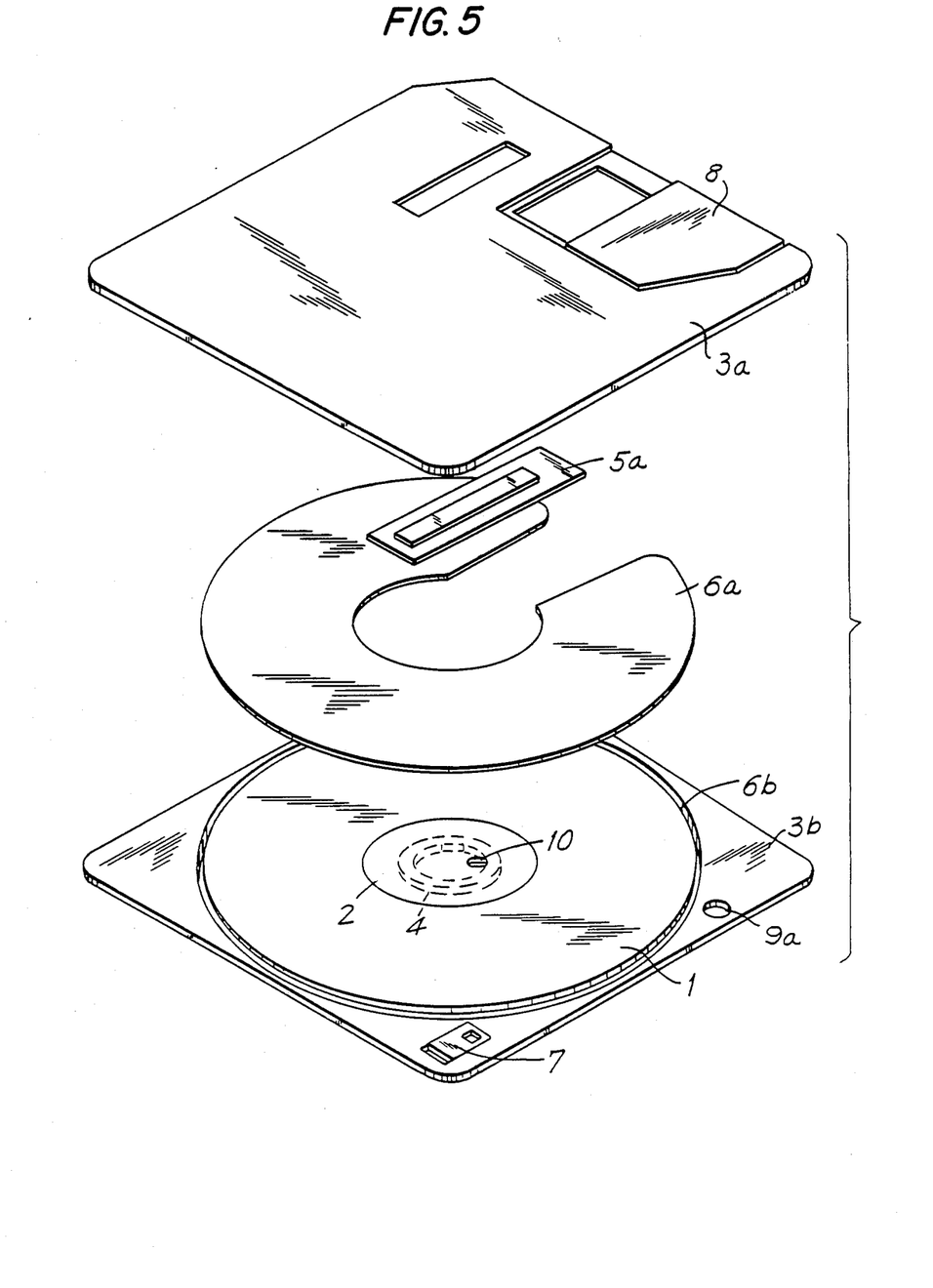
FIG. 5 is a perspective view of the magnetic disk body utilized in the magnetic read/write apparatus of the present invention.

FIG. 5 is a perspective view showing the magnetic disk body utilized in the magnetic read/write apparatus according to the present invention. The reference numeral 1 is a film type magnetic disk including magnetic member on the surface thereof The reference numeral 2 is a media hub made of magnetic material to mount the magnetic disk 1 on the spindle hub of the magnetic read/write apparatus by the magnetic attraction force. The reference numeral 4 is a center core. The reference numeral 5a is a cleaning plate for pressing the liner 6a to clean the surface of the magnetic disk 1. Similarly, the liner 5b and the cleaning plate 6b are also constructed downward relative to the magnetic disk. The reference numeral 7 is a switch for preventing the error omission The reference numeral 8 is a shutter for securing the surface of the magnetic disk 1. The reference numeral 9a is a guide hole for positioning the disk cartridge to the magnetic read/write apparatus. The other guide hole 9b is constructed in the symmetry The reference numeral 10 is a positioning hole for driving the magnetic disk 1 and the media hub 2 and for generating the power for pressing the center core against the spindle core. The reference numeral 3a is a upper disk cartridge. The reference numeral 3b is a lower disk cartridge which is integrally formed with the magnetic disk 1, after mounting the magnetic disk 1 and the like.

In such a construction, while the magnetic disk 1 is rotated, the surface of the magnetic disk 1 is cleaned by pressing against the cleaning plates 5a and 5b, and at the same time the deflection of the surfaces is restrained.

Figure 13:
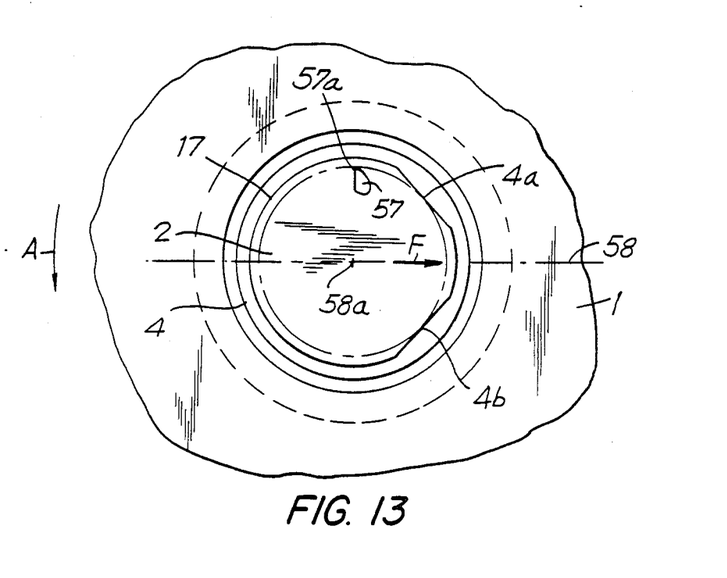
FIG. 13 is a bottom plan view of the embodiment showing the media hub according to the magnetic read/write apparatus of the present invention.

FIG. 13 is a bottom plan view explaining the center core of the magnetic disk body according to the embodiment of the present invention. The reference numeral 1 is a magnetic disk. The reference numeral 2 is a media hub including a magnetic disk 1, and made of magnetic material to attract the spindle hub 17 shown by the one dotted line with magnetic attraction force. The reference numeral 4 is a center core which is composed of the positioning surfaces 4a and 4b to guide the side of the spindle hub 17. The reference numeral 57 is a positioning hole for positioning and driving the media hub 2. The positioning hole has a liner portion 57a in the direction of the substantially 90 degree from the center 18a of the magnetic disk relative to the center line 58 of the positioning surfaces 4a and 4b. In addition, if the positioning hole 57 has a straight line portion 57a, the other portion may have any proper shape.

In such a construction, since when the magnetic disk 1 is rotated, some load of torque is generated, and the driving power is applied to the straight line portion 57a. By utilizing the reverse power F of the driving power, the positioning planes 4a and 4b are pressed against the spindle hub 17. Therefore, when the angle between the center line of the positioning planes 4a and 4b and the straight line portion 57a becomes 90 degree, it is possible to press and position them most effectively. In addition, the reference numeral r is an arrow indicating the rotating direction of the disk.

Figure 12:
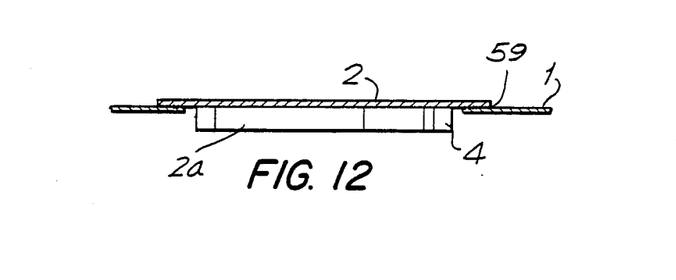
FIG. 12 is a sectional view of FIG. 13.

FIG. 12 is a sectional view of FIG. 13, wherein the magnetic disk 1 is adhered to the media hub 2 through a thin layer 59 such as adhesives or double-side adhesives. The center core 4 is in contact with the media hub 2 by the outsert or adhesives. The media hub 2 is made of magnetic material and is attracted to the spindle hub by magnetic force. The surface of the media hub contacting with the magnetic disk 1 is on the same plane as the reference plane 2a contacted with the spindle hub.

Figure 6:
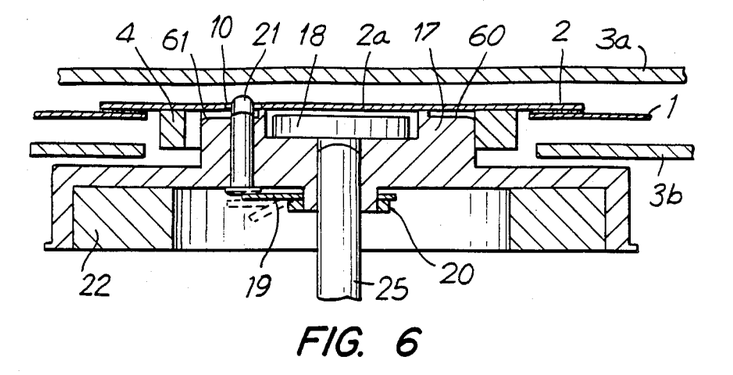
FIG. 6 is a sectional view showing the engaging portion between a media hub and a spindle hub according to the embodiment of the magnetic read/write apparatus of the present invention.
Figure 7:
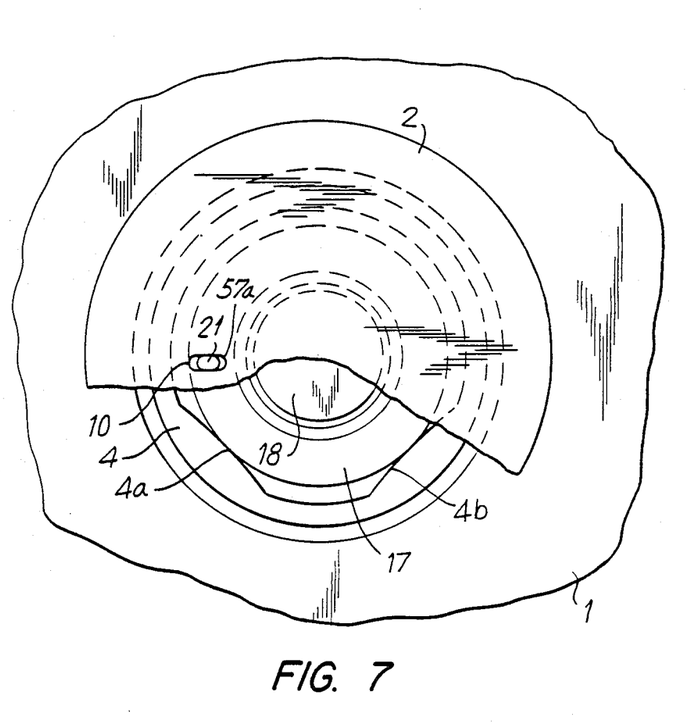
FIG. 7 is a plan view of FIG. 6.

FIG. 6 is a sectional view showing the engaged condition sectionally of the media hub and the spindle hub according to the embodiment of the magnetic read/write apparatus of the present invention, and FIG. 7 is a plan view. The reference numeral 21 is a driving pin which is mounted on the spindle hub to vertically be moved and is engaged with the straight line portion 57a of the positioning hole 10 of the media hub 2 for positioning and driving. The reference numeral 19 is a driving pin spring for pushing up the driving pin 21. The reference numeral 20 is a spring pressing means for securing the driving pin spring 19 to the spindle hub 20. The reference numeral 2a is a reference surface of the media hub contacted with the upper surface of the spindle hub. The reference numeral 60 is a relief portion for preventing the change of the height of the reference plane 2a which may be caused by the burrs thereof The reference numeral 4 is a center core and positions the sides by engaging with the spindle hub 17 at the positioning planes 4a and 4b wedge-shapedly. The reference numeral 61 is a cutting portion which is provided for engaging between the spindle hub 17 and the center core 4 easily at the time of setting up the magnetic disk body. In addition, the sizes of the relief portion and the cutting portion are not limited to those of the embodiment, and they may be constructed at any portions.

Under such a construction, at the time of setting up the magnetic disk as shown by one dotted line, the driving pin 21 is pressed against the reference plane 2a to store within the spindle hub 17 by the elastic deformation of the driving pin spring.

The driving pin 21 is slided on the reference plane 2a until engaging with the positioning hole 21. Upon the engagement, the driving pin raises up by the elastic force to position at the home position, thereby the engagement is completed sectionally.

At this time, the length of from the media hub to the end of the projected driving pin is little because of a small diameter thereof and a little clearance, making it easy to provide a thin device. The push-up power of the driving pin spring 19 need to be more than 3 g by the friction and the weight between the driving pin spring 19 and the spindle hub 17. If it is not more than 3 g, the sufficient rising speed is not obtained relative to the sliding speed and it is impossible to again press and engage with the driving pin spring 19 prior to accelerating the speed. Further, when the driving pin 21 drives the magnetic disk having the diameter of 2.1 to 2.9 inch, the driving pin 21 having the diameter of more than 0.4 mm is required If the driving pin 21 has the diameter of more than 2 mm, the device becomes large sized entirely, thus, such a device is meaningless.

The spindle hub 17 serves as a reference hub for positioning the height and the side of the disk. The spindle hub 17 having a large diameter is required to increase and stabilize the contacting area of the positioning planes 4a and 4b. The spindle having a small diameter is required to keep the sufficient memory capacity. Therefore, it is suitable that the spindle hub 17 has the diameter of 10.5 to 11.5 mm.

The attraction force of the magnet 18 requires the force of more than 10 g to be adapted for the magnetic disk and to press the spindle hub downward, even if the magnetic head or the cleaning plate has the different height from that of the spindle hub. On the contrary, when the magnetic disk has the diameter of 2.1–2.9 inch, the maximum value of the attraction force is limited as follows:

When the equivalent contact radius of the spindle hub 17 and the media hub 2 is RH, the coefficient of friction is $\mu H$, and the attraction force of the magnet 18 and the media hub 2 is FH, the sliding torque until positioning the spindle hub 17 and the media hub 2 A is expressed by the following equation: $A = RH \times FH \times \mu H$. On the contrary, where the equivalent contact radius of the magnetic disk and the magnetic head is RD, the coefficient of friction is uD, the pressing force is FD, the equal contact radius of the liner under the magnetic disk and the cleaning plate is RP, the coefficient of friction is up and the pressing force of the pressing contact is FP, the sliding torque B of the magnetic head and the sliding torque C caused by pressing the liner against the magnetic disk by the cleaning plate are given by the following equations:
$B = RD \times FD \times \mu D$,
$C = RP \times FP \times \mu P$.

Herein in order to slide the media hub, the spindle hub and a driving pin is expressed by the following: $A < B + C$. Therefore, as the concrete values for example, RH=4~6 mm, $\mu H$=0.2–0.5, RD=17–27 mm, FD=7–30 g, $\mu D$=0.3–0.8, RP=20–30 mm, FR=0.5–10 g, 0.2–0.6. Therefore, in view of the above condition, the attraction force of the magnet 18 is preferable to be less than 300 g, because the strong magnetic force may have the bad effects on the magnetic read/write characteristics. As aforementioned, when the magnetic disk is positioned by the upper surface and the side of the spindle hub, and the driving pin is provided inside of the guide portion at the side of the spindle hub, the guide portion of the side is not affected by the diameter of the spindle hub, making it possible to provide a small-sized device.

Figure 14:
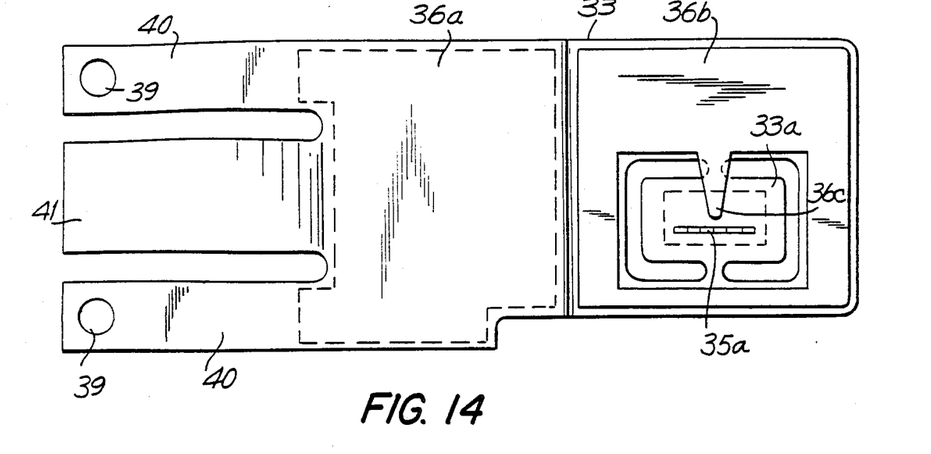
FIG. 14 is a plan view of the upper carriage of the embodiment according to the magnetic read/write apparatus of the present invention.
Figure 15:
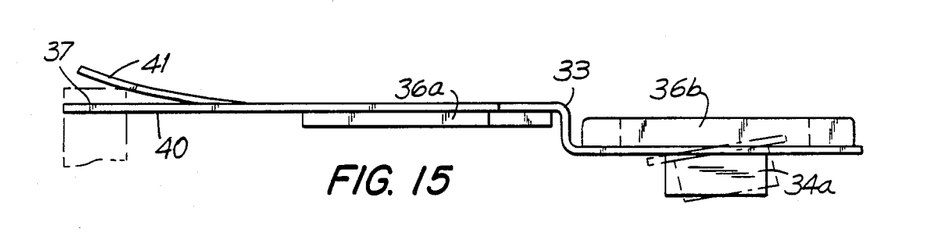
FIG. 15 is a side view of FIG. 14.

FIG. 14 is a plan view showing one embodiment of the upper carriage body, and FIG. 15 is a side view. The reference numeral 34a is an upper magnetic head. The reference numeral 35a is a head core. The reference numeral 33 is an upper carriage. The reference numeral 33a is an upper gimbal spring for enabling the elastic variety of the upper magnetic head 34a as shown by the one dotted line. The reference numeral 39 is a securing hole for securing an upper carriage 33. The reference numeral 40 is a suspension for supporting elastically the upper carriage. The reference numeral 41 is a spring portion for giving the pressing force to the magnetic head. The reference numerals 36a and 36b are supporters for preventing the deflection of the other portions than the desired portion. The reference numeral 36c is a pivot which supports the upper magnetic head at one point, allowing to rotate as shown by the one-dotted line and preventing the vertical displacement.

Under such a construction, the suspension, the spring portion and the gimbal spring are integrally formed, although in general, they are formed separately.

Figure 16:
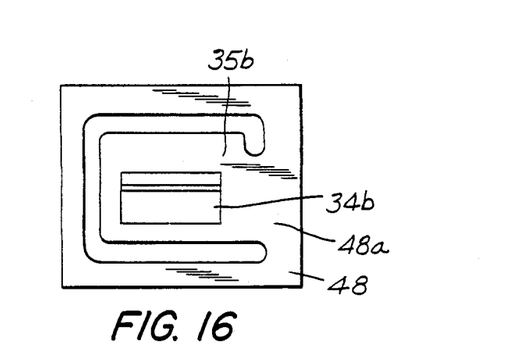
FIG. 16 is a plan view of lower gimbal spring of the embodiment according to the magnetic read/write apparatus of the present invention.
Figure 17:
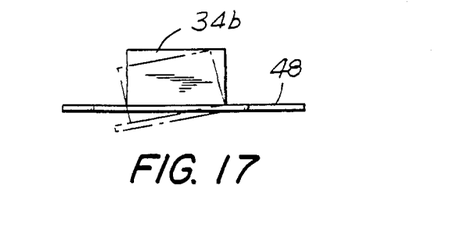
FIG. 17 is a side view of FIG. 16.

FIG. 16 is a plan view showing one embodiment of the lower magnetic head. FIG. 17 is a side view. The reference numeral 34b is a lower magnetic head. The reference numeral 35b is a head core. The reference numeral 48 is a lower gimbal spring. The reference numeral 48a is taibar portion. The lower magnetic head is deformable as shown by the one-dotted line.

Figure 18:
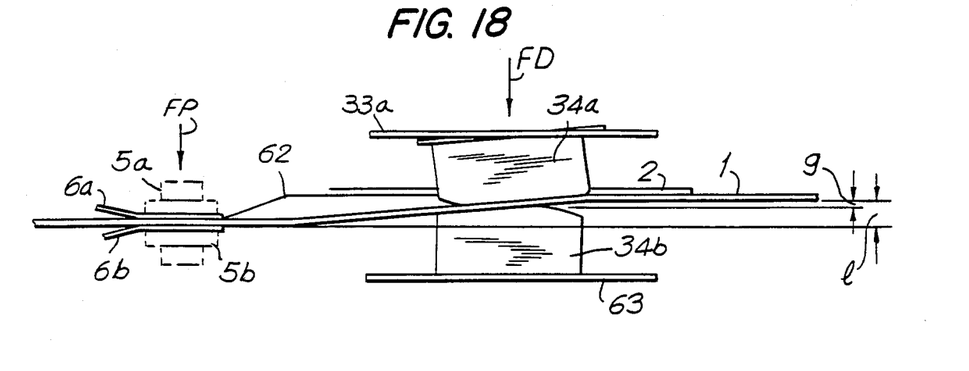
FIGS. 18 and 19 are explanatory views of the embodiment according to the magnetic read/write apparatus of the present invention.
Figure 19:
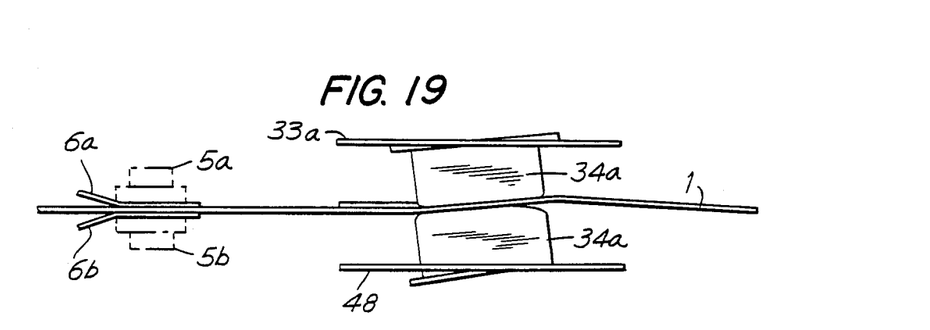

FIG. 18 and FIG. 19 are views explaining the effects in the several height of the spindle. FIG. 18 shows the condition prior to adjusting the height of the spindle hub. FIG. 19 shows the condition after adjusting the height of the spindle hub. The reference numeral 1 is a magnetic disk. The reference numeral 2 is a media hub. The reference numerals 5a and 5b are cleaning plates. The reference numerals 6a and 6b are liners by which the surfaces of the magnetic disk 1 are cleaned under the pressure of the cleaning plates 5a and 5b. The reference numeral 33a is a upper gimbal spring. The reference numeral 63 is a fixed lower gimbal spring for securing the magnetic head. The reference numeral 34a is a upper magnetic head. The reference numeral 34b is a lower magnetic head.

In such a construction, the heights of the media hub 2 and the lower magnetic head 34b are uniform securely and the only upper magnetic head 34a is movable. If the heights of them are different, the surfaces of the media hub 2, the cleaning plates 5a and 5b, and the lower magnetic head 34b are not on the same plane with each other, therefore, it is necessary to give the strong pressing force FP of the cleaning plates 5a and 5b and the strong pressing force FD of the magnetic head and to contact with the magnetic disk biasedly. However, the lower magnetic head 34b is apart from the magnetic disk by a slight amount g as shown in FIG. 18, and such a spacing loss has a bad influence in the magnetic read/write characteristics. It is necessary to provide many driving torques of the spindle motor for contacting the magnetic disk with the lower disk head under pressure and further, the surface of the magnetic disk 1 may be damaged or any sharp curve point 62 may be caused, which has a bad influence in the contacting condition of the media hub and the magnetic disk 1. Therefore, such a construction requires a high accurate assembly and can not provide a device of a low cost.

FIG. 19 shows the condition where the media hub 2 is positioned downward relative to the condition of FIG. 18. The surfaces of the cleaning plates 5a and 5b are equal to the surface of the media hub 2 and the upper magnetic head 34a is fit for the lower magnetic head 34b, making it possible to provide an excellent magnetic head contact.

At this time, since the media hub is small-sized, the space between the media hub and the magnetic head is got longer, and since the magnetic disk is operated softly on appearance, thereby making it possible to provide an excellent magnetic head contact.

Figure 3:
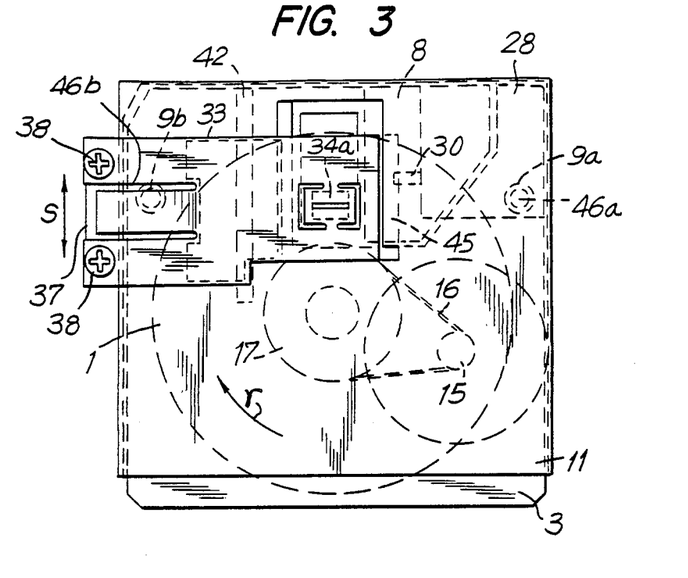
FIG. 3 is a top plan view of the embodiment according to the magnetic read/write apparatus of the present invention.
Figure 4:
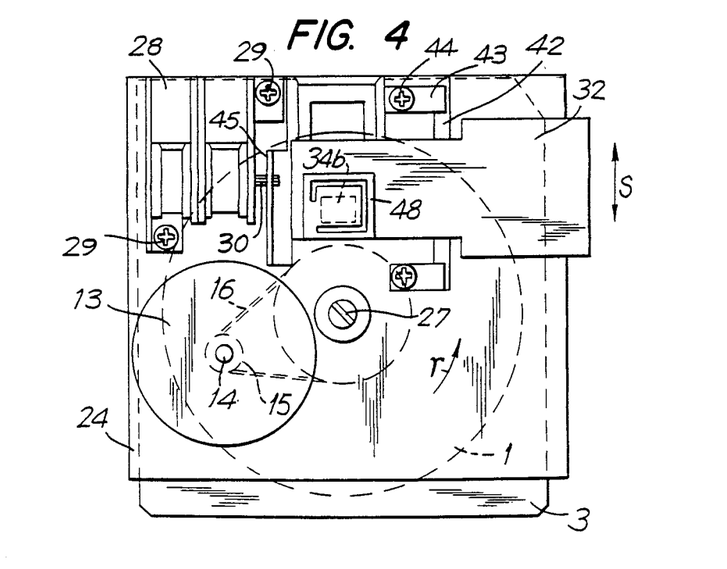
FIG. 4 is a bottom plan view of the embodiment according to the magnetic read/write apparatus of the present invention.

In addition, the present embodiment of the device having the cleaning plates 5a and 5b and a movable lower gimbal spring 48 are described above.. However, instead of the lower gimbal spring 48, immovably fixed lower gimbal spring 63 enables to contact the magnetic heads with each other excellently. Further, even if there is no cleaning plates 5a and 5b, the fixed area is reduced, and the excellent head contact is obtained FIG. 3 is a top plan view of the embodiment according to the magnetic read/write apparatus of the present invention. FIG. 4 is a bottom plan view of the embodiment according to the magnetic read/write apparatus of the present invention. The arrow r shows a rotating direction of the magnetic disk 1. The arrow S shows a seaking direction of the lower carriage 32, the upper carriage 33 and the like. The reference numeral 28 is a stepping motor for seaking a luck 45 constructed in the lower carriage 32 by a pinion 30. The reference numeral 29 is a fixing screw for fixing the stepping motor 28. The reference numeral 42 is a slide axis for seaking. The reference numeral 43 is a pressing spring for the slide axis. The reference numeral 44 is a fixing screw of the pressing spring 43. The reference numeral 37 is a projection of the lower carriage 32 to lift up the spring portion of the upper carriage 33. The reference numeral 38 is a fixing screw for supporting the upper carriage on the lower carriage. The reference numerals 46a and 46b are positioning pins which are fixed on a casing 24. The spindle motor 13, the stepping motor 28 and the slide shaft 42 are positioned downward of the disk cartridge 3, and the contacting portion of the upper carriage 33 and the lower carriage 32 is positioned in the side of the slide shaft 42, therefore, such a construction enables to provide a small-sized device.

Figure 8:
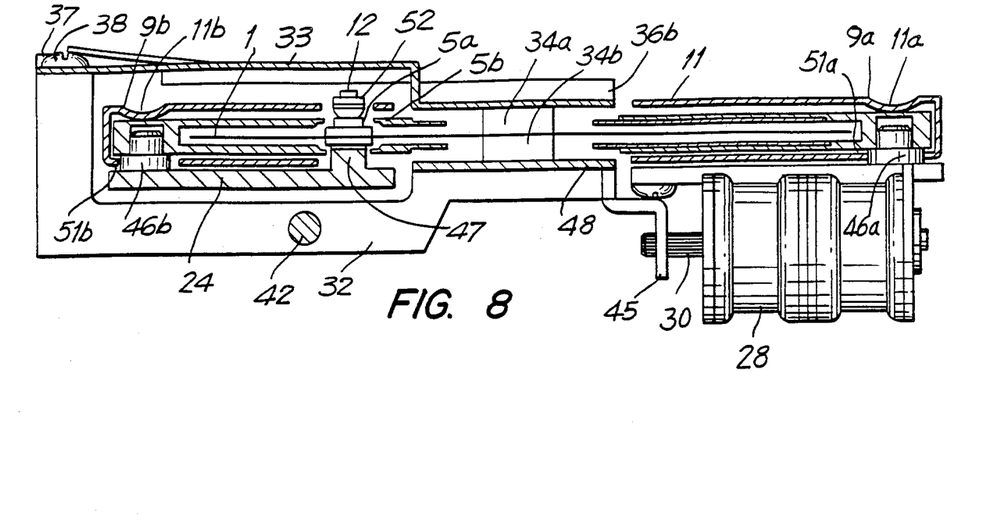
FIG. 8 is the other sectional view of the embodiment according to the magnetic read/write apparatus of the present invention.

FIG. 8 is the other sectional view of the embodiment according to the magnetic read/write apparatus of the present invention, which shows the condition of a stepping motor 28, a pinion 30, a luck 45, positioning pins 46a and 46b, a upper magnetic head 34a, a lower magnetic head 34b, a upper carriage 33, a lower carriage 32 and the like. The positioning pins 46a and 46b are positioned in mesh with the guide holes 9a and 9b through the pin holes 51a and 51b of the holder, under pressure at the contacting portions 11a and 11b.

Figure 10:
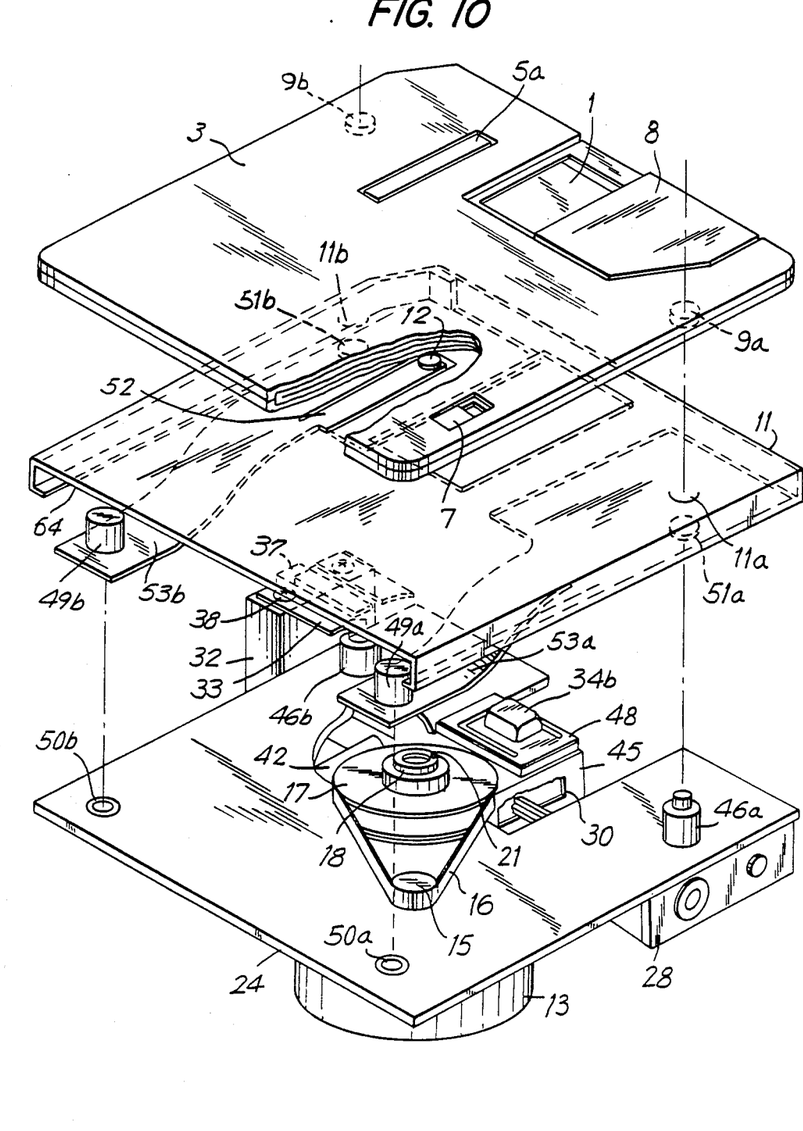
FIG. 10 is a perspective view of the embodiment according to the magnetic read/write apparatus of the present invention.

FIG. 10 is an exploded perspective view of the embodiment according to the magnetic read/write apparatus of the present invention. A holder 11 is integrally formed with a pressing spring portion 52 which is integral with or separate from a pressing contact 12, spacers 49a, 49b for positioning the disk cartridge 3, spacers 49a, 49b and holder press spring members 53a, 53b. The casing 24 has a fixing holes 50a, 50b for fixing spacers 49a, 49b. The disk cartridge 3 having the magnetic disk 1 is inserted in a windows of the holder.

Figure 11:
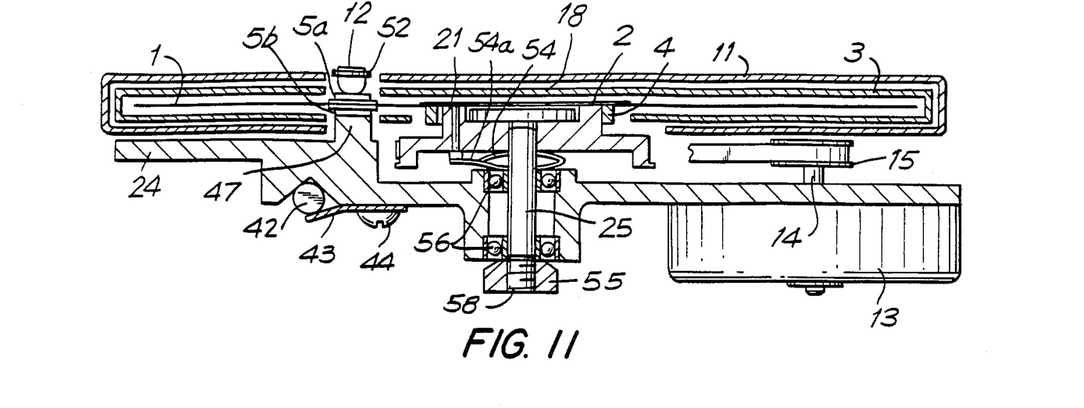
FIG. 11 is a sectional view of the other embodiment according to the magnetic read/write apparatus of the present invention.

FIG. 11 is a sectional view of the other embodiment according to the magnetic read/write apparatus of the present invention. The thrust spring 54 is positioned between a rolling bearing 56 and a spindle hub 17, and draws up the spindle 25 engaged with the spindle hub 17. While, a screw portion 58 is provided in the other end and is positioned by a pilot pressure nut 55. The thrust spring 54 is proper to have a dish shape. The part of the thrust spring 54 is stretched out as a cantilever spring 54a to serve as a driving pin spring and serve as a a pilot pressure of the rolling bearing 56.

In such a construction, in case of utilizing a thrust magnet it is possible to prevent some damage caused by the magnetic field in case of utilizing a thrust magnet or a bad influence in the characteristics of the rotating accuracy which may be varied by the increase of inertia.

Figure 20:
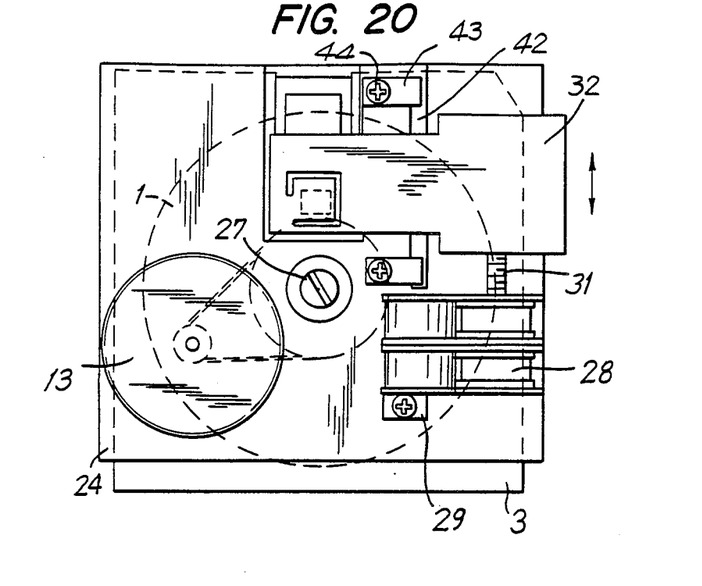
FIG. 20 is a bottom view of the embodiment according to the magnetic apparatus.

FIG. 20 is a bottom view of the other embodiment according to the magnetic read/write apparatus of the present invention. The lower carriage and the like are driven by a lead screw 31. Such a construction has advantage that the lower carriage 32 and the like is not moved easily against the power from externally and off-track is not caused easily.

Figure 21:
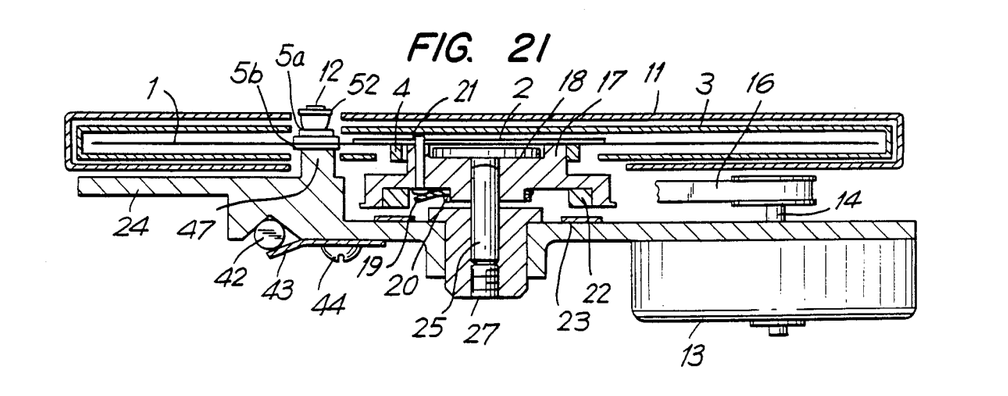
FIG. 21 is a sectional view of the other embodiment according to the magnetic read/write apparatus of the present invention.

FIG. 21 is a sectional view of the other embodiment according to the magnetic read/write apparatus of the present invention. The adjusting screw 27 is provided directly in a bush 27 comprising an oil or metal bush or the like.

In such a way, since the casing 24 does not require screw portions, it is possible to omit the space.

Figure 22:
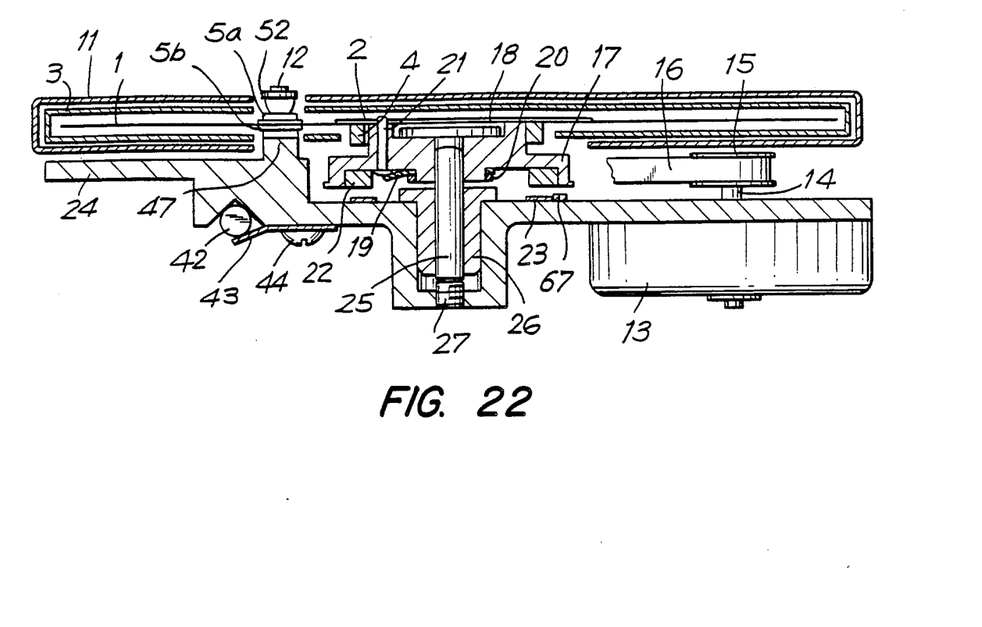
FIG. 22 is a sectional view of the other embodiment according to the magnetic read/write apparatus of the present invention.
Figure 23:
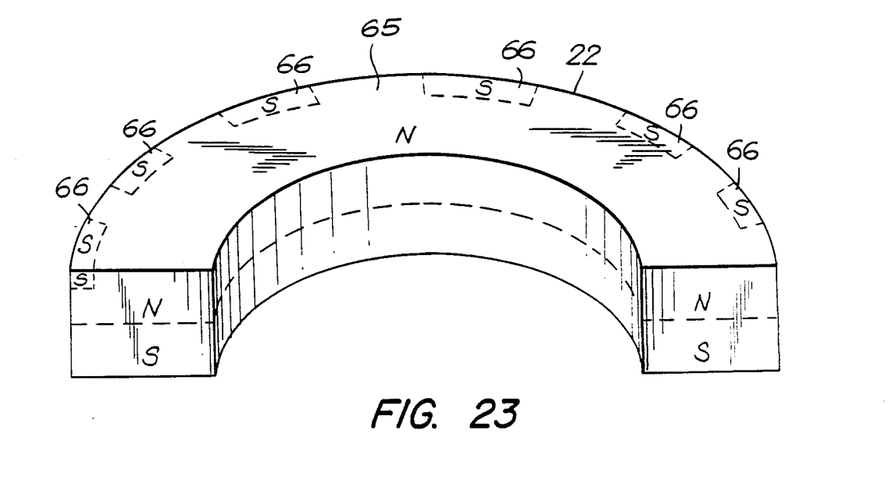
FIG. 23 is an explanatory view showing the magnetized condition of the thrust magnet.

FIG. 22 is a sectional view of the other embodiment according to the magnetic read/write apparatus of the present invention. FIG. 23 is an explanatory view of the thrust magnet. The thrust yoke 23 integrally formed with or separately from the casing 24 relative to the spindle hub 17 including the magnetic disk 1 is attracted by the thrust magnet 22 having the magnetic attraction force. The reference numeral 65 is a main magnetized pattern for generating the magnetic attraction force. The reference numeral 66 is a FG magnetized pattern comprised in a part of the main magnetized pattern for detecting the rotating speed of the spindle hub 17 stored in the thrust magnet 22. The reference numeral 67 is a magnetic detector for detecting the rotating speed and detecting the magnetic flux leaked from the FG magnetized pattern 66. In addition, In FIG. 23, the boundary of the magnetization of N and S polars is shown by the broken line.

In such a construction, since FG magnetized pattern 66 is constructed at one part of the main magnetized pattern 65, the rotating count of the spindle hub 17 can be detected by the magnetic detector 67 with having little influence in the magnetic attraction force, and further, since the FG magnetized pattern 66 and the main magnetized pattern 65 can be formed with one unit, making it easy to provide a magnetic read/write device of a small size and low cost.

In addition, only one embodiment of the magnetized pattern according to the present invention is shown, but the shape, displacement, dividing counts and the like are not limited to the embodiment. Detecting elements such as hole element, magnetic resistance element and coils can be utilized as the magnetic detecting member.

The embodiment and the operation according to the magnetic read/write apparatus of the present invention are explained above. The subject matter of the present invention is that the spindle member constructed which is apart from the spindle motor is movable in the axial direction. The practical condition is not limited to the description of the present embodiment. Further, the present invention is not limited to be adaptable for only magnetic read/write apparatus.

As aforementioned, since to position the magnetic disk radially is performed on the side of the spindle hub and inside of the portion where the driving pin is positioned, making it possible to provide a small-sized media hub and a small-sized spindle hub, The present invention has excellent advantage in a high capacity and excellent head contact, and a small-sized the magnetic read/write apparatus.

What is claimed is:

1. An assembly including a magnetic read/write apparatus for a magnetic disk having a media hub of magnetic material, said magnetic read/write apparatus including a read/write head for coming into contact with said magnetic disk, comprising:
   a center core integrally formed and coaxial with said media hub, the center core having an inner portion and a central axis;
   a spindle hub having an upper surface for selectively contacting said inner portion of said center core and peripheral positional surfaces for positioning said magnetic disk in a radial direction;
   positional surfaces extending from said inner portion of said center core, said positional surfaces contacting said spindle hub at the peripheral surfaces of the spindle hub;
   a driving aperture provided in the media hub within the inner portion of the center core; and
   a driving pin mounted within an area circumscribed by said peripheral positional surfaces of said spindle hub to be received by said driving aperture to bring said spindle hub in contact with said media hub within the center core, wherein said driving pin is adapted to drive said disk so that said pair of positioning surfaces of said disk are urged toward the radial direction relative to said spindle hub.

2. The magnetic read/write apparatus of claim 1, further comprising a pair of read/write heads with said heads supporting said disk therebetween.

3. The magnetic read/write apparatus of claim 1, further comprising adjusting means for adjusting the height of the spindle hub.

4. The magnetic read/write apparatus of claim 3, wherein said adjusting means includes a screw.

5. The magnetic read/write apparatus of claim 1, wherein said media hub is made of a magnetic material and further comprising a magnet mounted on said spindle hub, said media hub being biased towards said spindle hub by said magnet.

6. The magnetic read/write apparatus of claim 5, further comprising a cleaning plate, said cleaning plate being biased towards said disk.

7. The magnetic read/write apparatus of claim 1, further comprising a cleaning plate, said cleaning plate being biased towards said disk.

8. The magnetic read/write apparatus of claim 1, wherein the two positional surfaces on the inner core form an angle of about 90° facing the center axis of the spindle hub.

9. A magnetic read/write apparatus for a magnetic disk having media hub made of magnetic material said media hub including a center core integrally formed and coaxial with said media hub, the center core having an inner portion and a central axis, an aperture provided in the media hub within the inner portion and two positional surfaces extending from said inner portion of said inner core being generally narrowed in the radial direction from the central axis, said magnetic read/write apparatus comprising:
   a head for coming in contacting with said magnetic disk;
   a spindle hub, said spindle hub having an upper surface for selectively contacting said inner portion of said center core, peripheral positional surfaces for contacting the positional surfaces extending from the central core; and
   a driving pin provided within an area circumscribed by said peripheral positional surfaces of said spindle hub to be received by said aperture to bring said spindle hub in contact with said media hub within said center core, wherein said driving pin is adapted to drive said disk so that said pair of positioning surfaces of said disk are urged toward the radial direction relative to said spindle hub.

10. A magnetic disk for being read by a magnetic read/write apparatus, a magnetic read/write apparatus including a head for coming in contact with a magnetic disk, a spindle hub having an upper surface and peripheral positional surfaces and a driving pin provided on said spindle hub within an area circumscribed by said peripheral positional surfaces, said disk comprising a media hub made of magnetic material;
   a center core integrally formed and coaxial with said media hub, the center core having an inner portion and central axis, the inner portion of said center core selectively contacting said upper surface of said spindle hub and positioning said magnetic disk in a radial direction;
   two positional surfaces extending from said inner portion of said inner core and being generally narrowed in the radial direction from the central axis, said positional surfaces contacting said spindle hub at the peripheral positional surfaces of the spindle hub for positioning the magnetic disk in a radial direction;
   said media hub being formed with an aperture within the inner portion, said driving pin being received by said aperture to being said spindle hub in contact with said media hub within the center core, wherein said driving pin drives said disk so that said pair of positioning surfaces of said disk are urged toward the radial direction relative to said spindle hub.

* * * * *